March 24, 1970   P. J. CASSIDY ET AL   3,501,983
METHOD AND APPARATUS FOR MODULE ALIGNMENT OF OCULAR SYSTEMS
Filed Feb. 23, 1966   5 Sheets-Sheet 1
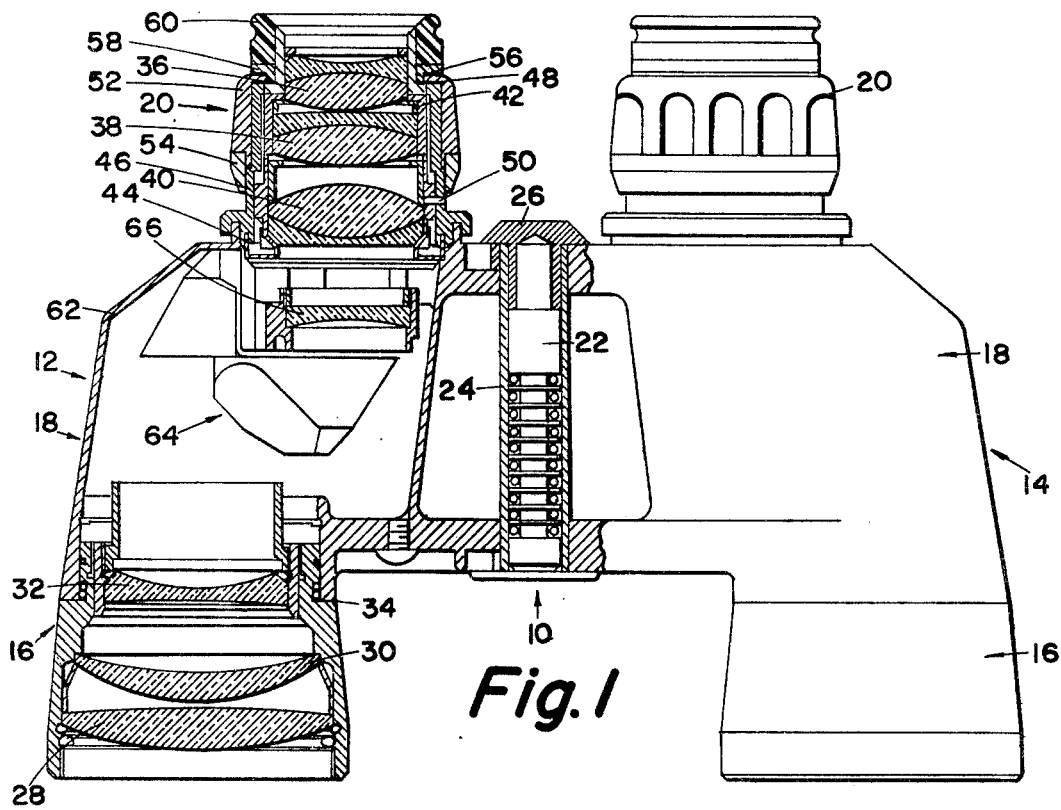
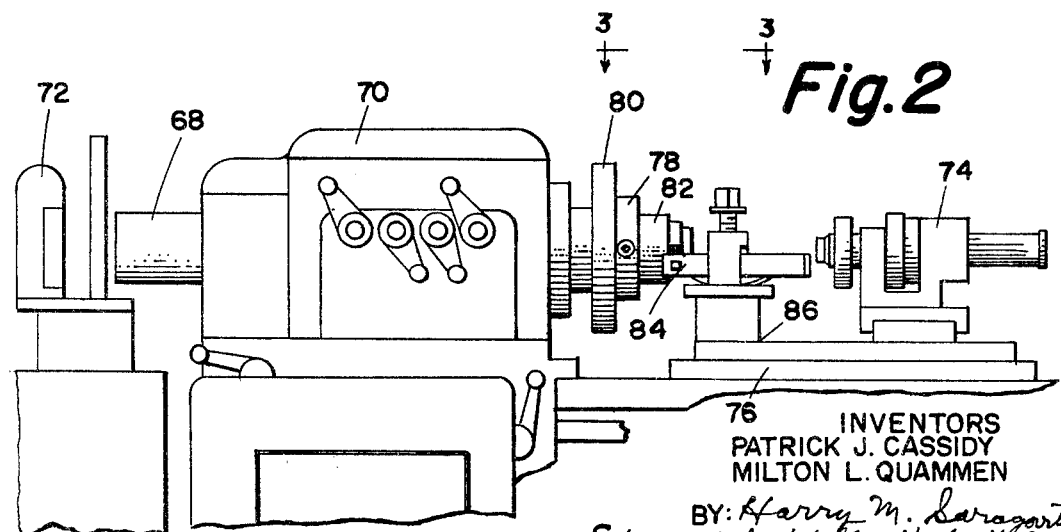
INVENTORS
PATRICK J. CASSIDY
MILTON L. QUAMMEN
ATTORNEYS

INVENTORS
PATRICK J. CASSIDY
MILTON L. QUAMMEN
ATTORNEYS

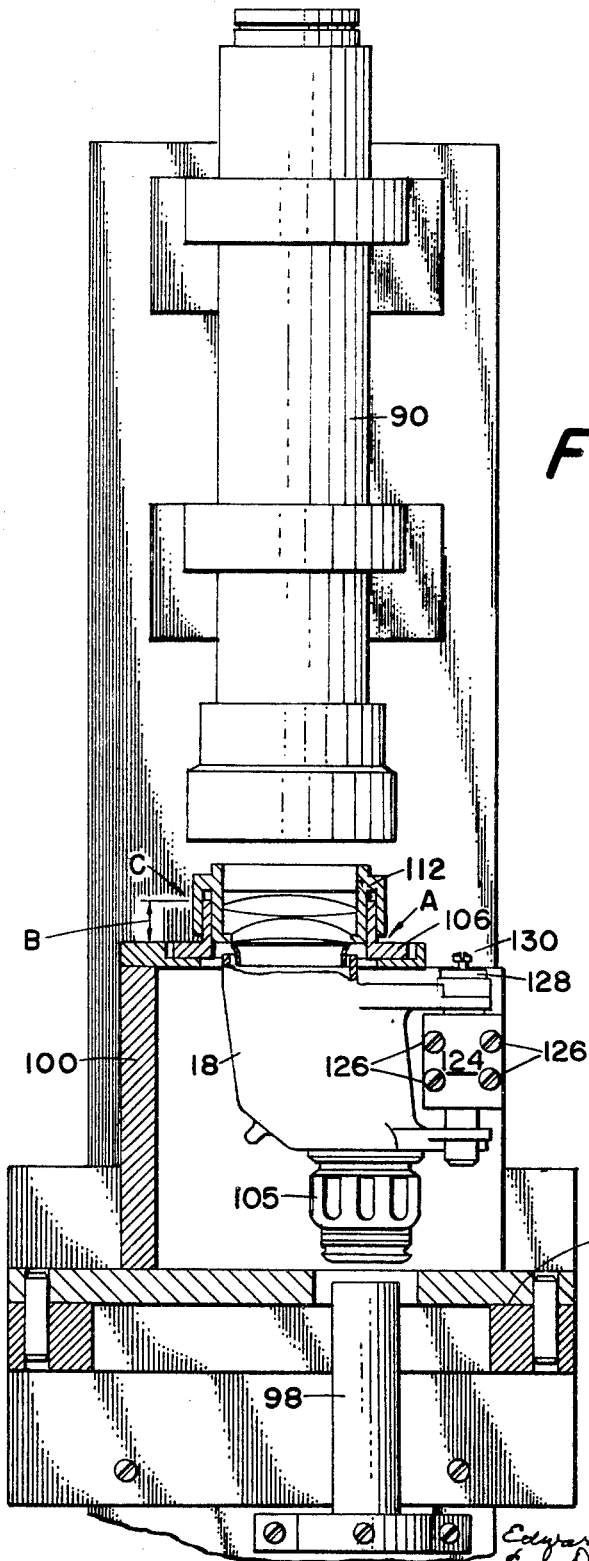

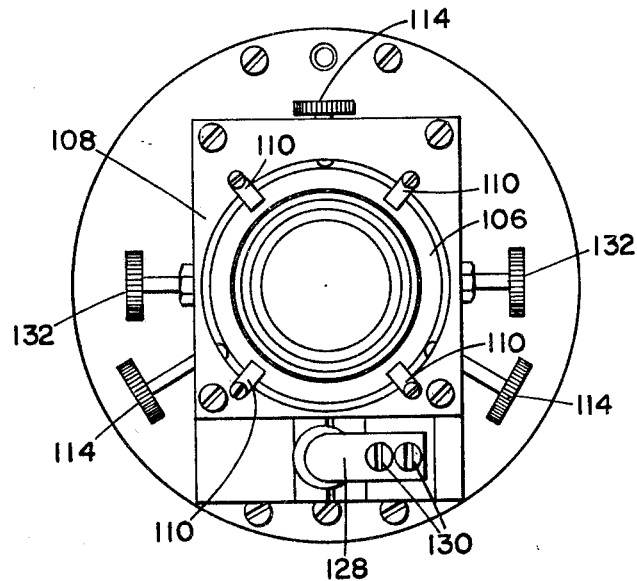
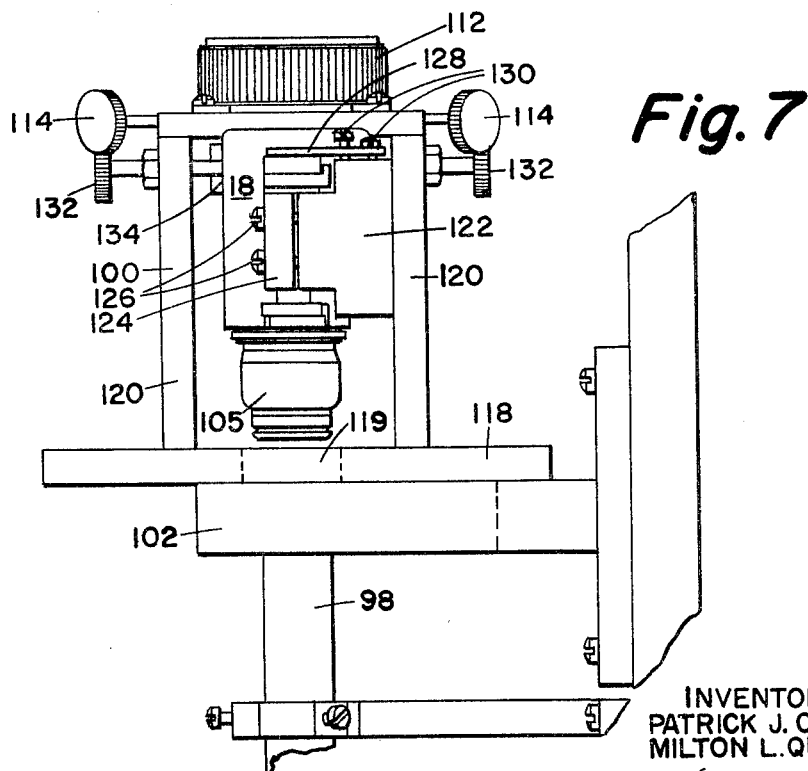

United States Patent Office 3,501,983
Patented Mar. 24, 1970

3,501,983
METHOD AND APPARATUS FOR MODULE ALIGNMENT OF OCULAR SYSTEMS
Patrick J. Cassidy and Milton L. Quammen, Philadelphia, Pa., assignors to the United States of America as represented by the Secretary of the Army
Filed Feb. 23, 1966, Ser. No. 531,328
Int. Cl. B23b 1/00
U.S. Cl. 82—1                           2 Claims

ABSTRACT OF THE DISCLOSURE

Method for obtaining optical and mechanical concentricity of the module assemblies of an ocular system by machining and apparatus therefor. Mounted upon a lathe carrying a cutting tool is a collimator, a light source, a microscope and the particular assembly to be aligned. The collimator image is transmitted through the assembly to the focal plane of the assembly. The geometrical optical axis of the assembly is adjusted to be concentric with the lathe axis. The microscope focal plane is positioned to the focal plane of the assembly, positioning the cutting tool with respect to the assembly. The precise reference of the cutting tool face and microscope focal plane is pre-positioned to the established reference focal distance.

---

The invention described herein may be manufactured and used by or for the Government for governmental purposes without the payment to us of any royalty thereon.

This invention relates to the method and apparatus for aligning the modules of ocular systems and more particularly to the method and apparatus for aligning the modules of ocular systems by machining.

Each ocular system of a binocular consists of three major modular assemblies; i.e., the objective assembly, the body assembly, and the eyepiece assembly. Each modular assembly is pre-aligned optically during manufacture and must not be disassembled, and is interchangeable with equivalent assemblies in any other similar binocular without resorting to realignment and adjustment of the optical components.

It is therefore an object of the present invention to provide a binocular that can be easily repaired in the field.

Another object of this invention is the provision of a binocular wherein the interchangeability of assemblies can be accomplished without resorting to realignment and adjustment of components.

Still another object is to provide a binocular wherein the replacement of a module requires just a knowledge of removal, replacing its like module and cleaning of the optical elements.

The above objects as well as others together with the benefits and advantages of the invention will be apparent upon reference to the detailed description set forth below, particularly when taken in conjunction with the drawings annexed hereto in which:

FIG. 1 illustrates a plan view partly in section of a binocular.

FIG. 2 illustrates a side view of the alignment operation of the eyepiece or objective assemblies.

FIG. 6 illustrates a view taken along lines 6—6 of FIG. 5.

FIG. 7 illustrates a view taken along lines 7—7 of FIG. 5.

FIG. 8 illustrates a view taken along lines 8—8 of FIG. 5.

Figure 3:
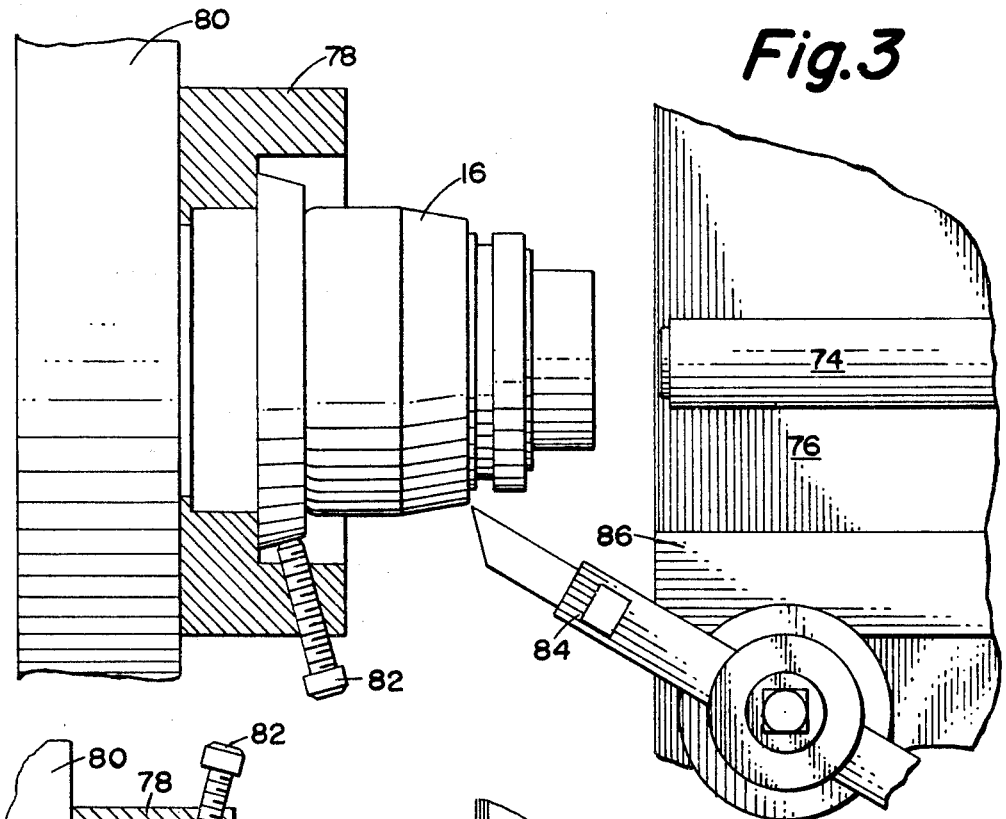
FIG. 3 illustrates a view taken along lines 3—3 of FIG. 2, showing the objective assembly being machined.

As seen in FIG. 1, the binocular 10 comprises three major assemblies each ocular system 12 and 14, i.e. the objective assembly 16, the body assembly 18 and the eyepiece assembly 20. A hinge assembly comprising a friction shaft 22, a hinge sleeve 24, and interpupillary index 26 are utilized in a manner described in our co-pending patent application, Ser. No. 510,147 filed Nov. 24, 1965 now Patent No. 3,431,043 issued Mar. 4, 1969, to join the two ocular systems 12 and 14 together to form the complete binocular 10.

The objective assembly 16 is a telephoto, air-spaced, triplet lens system containing two positive lenses 28 and 30 closely spaced and a negative lens 32 spaced at a distance from the positive lenses. The shoulder 34 of the unit is machined so that the back focal length of each assembly is the same and the optical axis is also centered on the mounting and thread diameter so that all units are interchangeable. The eyepiece assembly 20 consists of an eye lens 36, center lens 38 and field lens 40 assembled and sealed into an eyepiece cell 42. A rubber bellows 44 forms a seal between the field lens 40 and the eyepiece housing 46. The mounting surfaces of the eyepiece housing 46 are machined concentric to the optical axis of the eyepiece assembly 20. The mounting shoulder of the eyepiece housing 46 is machined in relation to the focal plane at zero diopter position. Once an eyepiece cell 42 and an eyepiece housing 46 have been paired and the eyepiece housing 46 machined, they must remain together. A thrust washer 48 retains them as an assembly. A pin 50 serves as a key to prevent rotation of the qualified eyepiece and prevent twisting of the bellows 44. The eyepiece assembly 20 is now a non-maintainable modular assembly and the optical or mechanical components must not be disassembled, turned or replaced because this will destroy the optical qualification. Threads (not shown) on the adapter 52 provide translation of the eyepiece assembly 20 for diopter adjustment. A diopter scale 54, graduated in one-half diopter increments from —4 to 0 to +4, is engraved on an adjustable scale. The adapter 52 is retained by a friction washer 56 and a retaining ring 58. The plastic eye cup 60 provides thermal insulation against cold.

The body assembly 18 consists of a body 62, a securely mounted shelf with a porro prism erecting system bonded to it, indicated generally by reference numeral 64, and a reticle lens 66 with and without a horizontal and vertical mil pattern in 10 mil increments, securely retained in said shelf assembly 64. Once the porro prism assembly 64 is mounted to the body 62 with screws (not shown) and locked in place, the mounting surfaces for mounting the objective assembly 16 are optically located with respect to the mouting surfaces for the eyepiece assembly 20 and in relation to the hinge pin axis. The seating surface for the objective assembly 16 is machined off with relation to the reticle focal plane. The prism must not be moved, removed or replaced in this prealigned assembly or the optical qualification of the module will be destroyed.

In machining the objective assembly 16 (see FIGS. 2 and 3), a collimator 68 is mounted on a regular shop lathe 70. A sodium lamp 72 is mounted in abutting relation to the rear of the collimator 68. A microscope 74 having an 8 mm. objective is attached to a carriage 76 which is slidable on the lathe 70. The collimator image is transmitted through the hollow spindle of the lathe (not shown), and through the objective assembly 16, mounted in housing 78, which is secured to the lathe 70 by face plate 80, to the focal plane of said objective assembly 16. The geometrical optical axis of the objective assembly 16 is adjusted to be concentric with the lathe axis by means of four adjusting screws 82. This is accomplished when the operator, by looking into the microscope 74, picks up the collimator reticle. By rotating the face plate 80 by hand, it will show how much the optical axis of the objective assembly 16 is eccentric. By adjusting the assembly with the aid of the four jack screws 82 and rotating the face plate 80, the operator can make the image of the collimator reticle stand perfectly still. The next step is to machine the objective assembly 16 and its threads concentric to its optical axis. A cutting tool 84 pivotally mounted on tool post 86 is pre-positioned from the microscope focal plane to the established referenced focal distance. Since every optical system will have its own unique focal plane, the operator is now in position to cut the flange face the same distance on every module. The operator looking through the microscope 74 at the collimator reticle will be in the correct position to cut when the reticle is at the sharpest focus.

Figure 4:
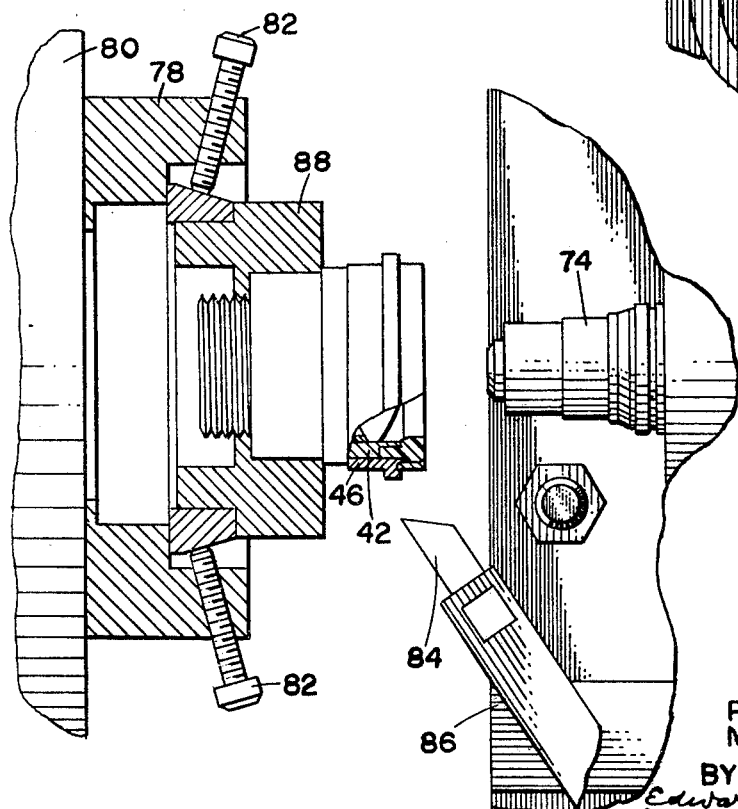
FIG. 4 illustrates a view taken along lines 3—3 of FIG. 2, showing the eyepiece assembly being machined.
Figure 5:
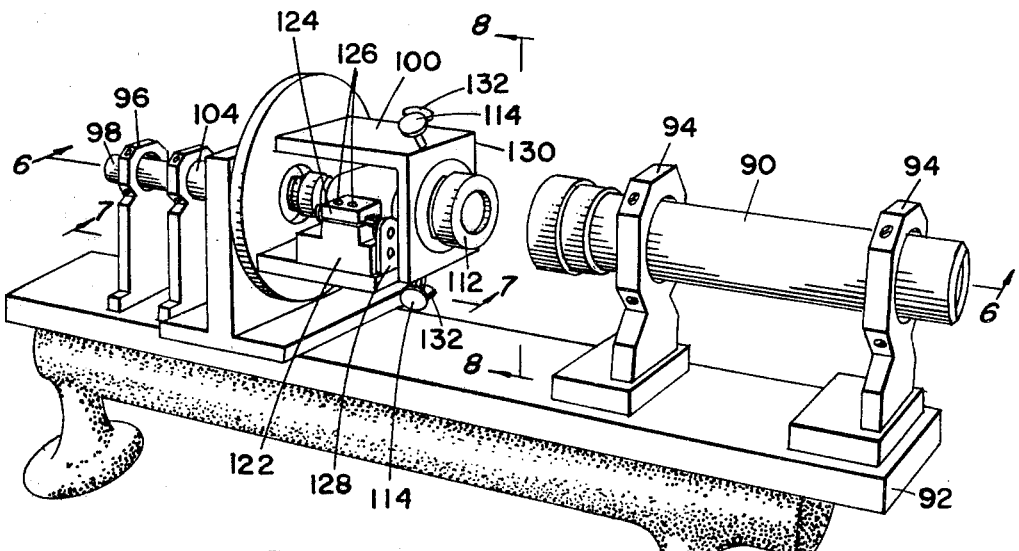
FIG. 5 illustrates a side view of the aligning operation of the body assembly.
Figure 9:
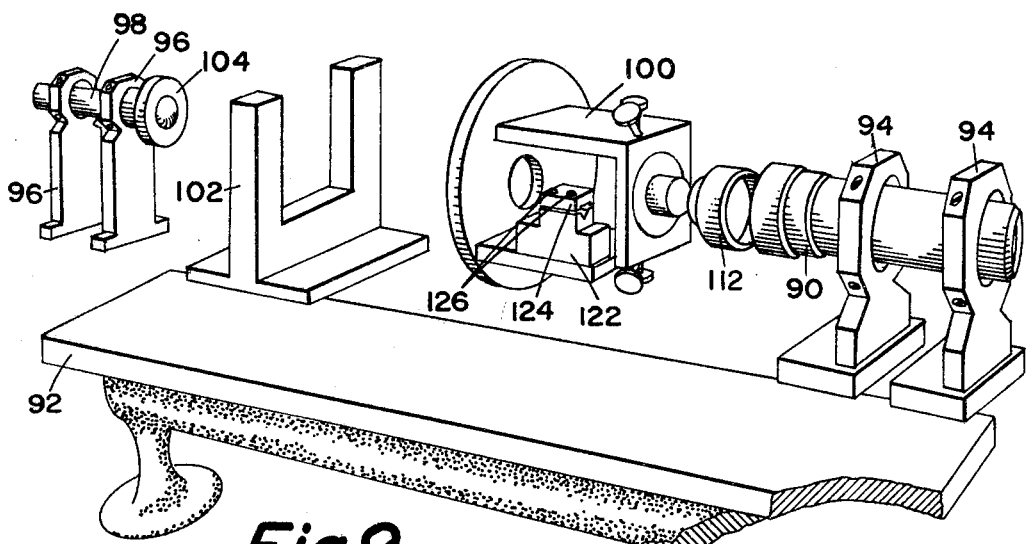
FIG. 9 illustrates an exploded view of the components of FIG. 5 with the body assembly left out.

In machining the eyepiece assembly 20 the same procedures as used in machining the objective assembly 16 are utilized, i.e. the collimator 68 mounted on lathe 70 with a sodium lamp 72 mounted in front of the rear of collimator 68. The microscope 74, having a 32 mm. objective, is mounted on a carriage 76 which also carries cutting tool 84 by way of tool post 86, with the exceptions that the reference focal distance is different and the eyepiece cell assembly is removed temporarily before the housing pilot is machined to the specified focal distance reference dimension. As shown in FIG. 4, the operator threads the eyepiece housing 46 into its slide assembly 88 mounted in housing 78 on the lathe 70. The cell assembly 42 is then inserted into the housing 46 as far as it will go. This will place the cell assembly 42 in the same position as it will be in the final eyepiece assembly at zero diopters. The face plate 80 is then rotated and the assembly adjusted with the aid of the four jack screws 82 until the collimator reticle stands still. This establishes that the optical axis of the eyepiece assembly is concentric with the lathe axis and that the housing 46 is ready to be machined. The cell assembly 42 is then temporarily removed from the housing 46. The cutting tool 84 has been pre-positioned from the microscope focal plane to the established referenced focal distance. Since every optical system will have its own unique focal distance, the operator is now in position to cut the flange face the same distance on every module.

To obtain specific collimation at final assembly and to insure interchangeability of bodies, the pilot diameter and screw thread must be machined parallel to the axis of the hinge and concentric to the optical path. The mounting face for the objective end of the body is machined to locate the objective focal plane properly with respect to the plano surface of the reticle thereby compensating for any variation of air glass path in the housing assembly.

In aligning the body assembly 18, as seen in FIGS. 5-9, the collimator 90 is secured to a table 92 by two posts 94. Also secured to said table 92 by posts 96 is a telescope 98. Located on table 92 between the collimator 90 and viewing telescope 98 is an alignment fixture 100 secured by bolts to a U-shaped bracket mounting 102 which is itself secured to the table 92 by bolts.

In operation the collimator 90 is first auto-collimated with respect to a reference surface X. After which the telescope 98 is auto-collimated with respect to reference surface X. A six-minute wedge 104 (see FIG. 9) is attached to the viewing telescope 98 to introduce an optical divergence factor. A master eyepiece 105 is placed on binocular housing 18 and the unit is placed in alignment fixture 100. Adapter 106 is placed in the center of top plate 108 and is held loosely therein by four clamps 110. A master objective 112 is then inserted and adjusted on adapter 106 to correctly focus on the reticle in the body assembly 18. The axis of the master objective 112 is aligned to the body and eyepiece optical axis with the aid of three centering jack screws 114 with respect to the hinge. This setting is achieved when the reticle patterns of the collimator 90 and telescope 98 are in alignment. Clamps 110 are then tightened and fixture 100 is removed from bracket mounting 102. The distance from the rim of the master objective 112 to a reference surface A of adapter 106 is then measured. This distance is subtracted from the nominal distance from the master objective rim to the machined face of the objective end of the body assembly 18. This dimension is added to a dimension B. The master objective 112 is then removed. The distance between a reference surface C and the end of body assembly 18 is then measured. This dimension is now subtracted from the above result and the answer will indicate the amount of the objective end of the body assembly 18 to be machined. A protective plug (not shown) is placed into the objective end of the body assembly 18. The fixture 100, having the body assembly 18 still therein, is placed on a lathe face place. The inside bore of the adapter is indicated. When the bore is running true then the optical axis of the body assembly 18 will be concentric to the mechanical axis. Adapter 106 is then removed and facing, boring and threading takes place on the body 62.

In addition to the above described elements, the alignment fixture 100 (see FIGS. 7 and 8) has a rounded base 118 having a hole 119 therein and side walls 120. A V-shaped mounting block 122 having a cap 124 is located on one side wall 120. The hinge assembly of the body to be aligned is positioned in the V-shaped portion of the mounting block 122 and then the cap 124 is secured by screws 126 thereto. To secure the hinge assembly for moving forward a front plate 128 is secured to block 122 by screws 130. The body being aligned is held in position by screw projection 132 having flat end portions 134 abutting said body.

Obviously many modifications and variations of the present invention are possible in light of the above teachings. It is therefore to be understood, that within the scope of the appended claims, the invention may be practiced otherwise than as specifically described.

We claim:

1. The method of aligning the modules of a binocular comprising two ocular systems including an eyepiece assembly, an objective assembly and a body assembly, each body assembly including a porro prism shelf assembly and a reticle lens, the steps of aligning said body assembly including:
   providing a table,
   providing a collimator on said table,
   providing a telescope on said table,
   providing an alignment fixture on said table between said collimator and said telescope,
   auto-collimating said collimator,
   auto-collimating said telescope,
   attaching a six-minute wedge to said telescope,
   mounting a master eyepiece on said body assembly,
   mounting said body assembly in said alignment fixture,
   placing an adapter on the top plate of said alignment fixture,
   placing a master objective on said adapter,
   adjusting said master objective to correctly focus on a reticle in said body assembly,
   aligning the axis of said master objective, removing said alignment fixture from said table,
   removing said master objective from said alignment fixture,
   placing a protective plug into said body assembly,
   providing a lathe,
   providing a carriage on said lathe,
   providing a face plate on said lathe, placing said alignment fixture on said face plate,
removing said adapter from said alignment fixture,
providing a cutting tool on said carriage,
cutting a flange into said body assembly, and
cutting the pilot diameter and threads on said body assembly concentric to the optical axis.

2. The method of aligning the modules of a binocular comprising two ocular systems including an eyepiece assembly, an objective assembly and a body assembly, each body assembly including a porro prism shelf assembly and a reticle lens, the steps of aligning said body assembly including:

providing a collimator and a telescope on a table,
providing an alignment mixture on said table between said collimator and said telescope,
auto-collimating said collimator and telescope,
attaching a six-minute wedge to said telescope,
mounting a master eyepiece on said body assembly,
mounting said body assembly in said alignment fixture,
placing an adapter on the top plate of said alignment fixture,
placing a master objective on said adapter,
adjusting said master objective to correctly focus on a reticle in said body assembly,
aligning the axis of said master of objective and removing said alignment fixture from said table,
removing said master objective from said alignment fixture,
placing a protective plug into said body assembly,
providing a carriage and a face plate on a lathe,
placing said alignment fixture on said face plate,
removing said adapter from said alignment fixture,
providing a cutting tool on said carriage,
cutting a flange into said body assembly, and
cutting the pivot diameter and threads on said body assembly concentric to the optical axis.

References Cited

UNITED STATES PATENTS

| | | | |
|---|---|---|---|
| 2,378,401 | 6/1945 | Gardner | 82—1 |
| 1,518,393 | 12/1924 | Currier | 88—56 |
| 1,981,690 | 11/1934 | Napoli et al. | 88—14 XR |
| 2,079,791 | 5/1937 | Cook | 82—1 |
| 2,129,130 | 9/1938 | Hammer. | |
| 2,365,361 | 12/1944 | Street. | |
| 2,759,393 | 8/1956 | McLeod. | |
| 3,055,259 | 9/1962 | Dietrich | 88—56 XR |

LEONIDAS VLACHOS, Primary Examiner

U.S. Cl. X.R.

29—407; 77—4; 88—14; 279—6